United States Patent [19]
Rioux et al.

[11] Patent Number: 5,685,387
[45] Date of Patent: Nov. 11, 1997

[54] SNOWMOBILE REDUCTION DRIVE

[75] Inventors: Roger Rioux; Gilles Pesant, both of Magog, Canada; Willy Bostelmann, Gunskirchen, Austria; Jean-Guy Talbot, Valcourt, Canada; Berthold Fecteau; Raymond Cote, both of Richmond, Canada; Yvon Gagne, Valcourt, Canada

[73] Assignee: Bombardier Inc., Canada

[21] Appl. No.: 426,919

[22] Filed: Apr. 21, 1995

[51] Int. Cl.$^6$ .................................................. B62M 27/02
[52] U.S. Cl. ............................................ 180/190; 180/376
[58] Field of Search ................................ 180/182, 186, 180/190, 191, 193, 376

[56] References Cited

U.S. PATENT DOCUMENTS

| | | | |
|---|---|---|---|
| 3,963,083 | 6/1976 | Reese | 180/190 |
| 3,985,192 | 10/1976 | Samuelson et al. | 180/190 |
| 4,069,882 | 1/1978 | Leonard et al. | 180/190 |
| 4,362,524 | 12/1982 | Lob et al. | 180/190 X |
| 5,152,255 | 10/1992 | Fukuda | 180/190 X |
| 5,172,786 | 12/1992 | Ishibashi et al. | 180/190 |
| 5,372,215 | 12/1994 | Fukuda | 180/190 |
| 5,533,585 | 7/1996 | Kawano et al. | 180/190 |

FOREIGN PATENT DOCUMENTS

| | | |
|---|---|---|
| 918200 | 1/1973 | Canada. |
| 943169 | 3/1974 | Canada. |

*Primary Examiner*—Kevin Hurley
*Attorney, Agent, or Firm*—Larson and Taylor

[57] ABSTRACT

This invention relates to an improved snowmobile drive train configuration arrangement that incorporates a fixed ratio speed reduction mechanism directly coupled to the engine crankshaft. This mechanism is in turn coupled to the driving pulley of a variable ratio belt drive system, the driven pulley of which is mounted on the axle of the sprocket wheels that drive the snowmobile track. Interposing the reduction drive between the engine and the belt drive system reduces the operational speed of both the pulleys and the belt, which proves beneficial from several aspects: the mechanical efficiency of the global system is increased, the dynamic response of the transmission to throttle modulation is improved; aerodynamic losses are reduced; the bending vibrations of the crankshaft are no longer transmitted to the drive clutch; and the engine can be run at higher RPM without decreasing the efficiency of the belt drive system.

13 Claims, 5 Drawing Sheets

SNOWMOBILE REDUCTION DRIVE

BACKGROUND OF THE INVENTION a) Field of the Invention

This invention relates to an improved snowmobile drive train configuration arranged between the engine and the track driving sprocket wheels, and to a snowmobile including such a drive train configuration.

b) Description of the Prior Art

Conventional snowmobile drive trains incorporate a variable ratio belt drive system having a driving pulley that is directly coupled to the engine. The driving pulley acts as a clutch and includes a centrifugally actuated adjusting means through which the drive ratio of the belt drive is varied progressively as a function of engine speed and output torque of the driven pulley. Typically, the driven pulley is coupled to a shaft which in turn drives the input member of a chain and sprocket reduction drive the output of which is coupled to one end of the axle of the track driving sprocket wheels. This arrangement suffers a number of drawbacks: the driving pulley and its associated speed change mechanism necessarily operate at high rotational speeds; the driving pulley is directly exposed to vibrations from the engine, which may cause excessive noise and wear; additionally, engine vibrations imposed upon the drive belt through the driving pulley reduce the efficiency of the belt drive system and can cause premature wear of the belt.

The two distinct speed reduction stages of the prior art (i.e. the variable ratio belt drive system and the chain-and-sprocket reduction drive) are necessary to obtain satisfactory engine RPM at low ground speed. The typical snowmobile engine produces its maximum power between 6500 and 8500 RPM, so that maximum acceleration from low speed can only be achieved if the engine is operated at this RPM level.

In theory, using only one reduction stage, namely the belt drive transmission system, could be made feasible by significantly increasing the diameter of the pulleys, so as to provide a wider range of drive ratios. However such an arrangement has proved to be unacceptable in practice because of physical limitations. Also, at high speed, it would necessitate a reduction ratio of nearly 2:1 in the belt drive transmission system in order to generate the maximum top speed. However, since the optimum mechanical efficiency of a belt drive transmission system is reached when the ratio is close to 1:1, such an arrangement would be far from ideal and from a performance aspect would always represent a compromise.

Consequently, the total reduction ratio needed is too high to be generated in the belt drive transmission system alone. Consequently, two distinct speed reduction stages are required.

SUMMARY OF THE INVENTION

The present invention provides a snowmobile comprising: a frame having a forward end supported on steerable ski means and a rearward end supported on an endless drive track; an engine mounted in said frame, said engine having a output that is connected via a drive train to deliver propulsion power to said drive track; said drive train comprising a variable ratio belt drive system and a speed reduction mechanism arranged in series, wherein said speed reduction mechanism is carried on said engine and has an output member that is coupled to drive said variable ratio belt drive transmission system, said variable ratio belt drive transmission system being coupled to said drive track to deliver the propulsion power thereto.

Preferably, the speed reduction mechanism has an input member that is drivingly coupled with the engine crankshaft and an output member that is coupled to drive the variable ratio belt drive transmission system which comprises a drive belt looped around a driving pulley and a driven pulley, a speed responsive mechanism operatively connected to said driving pulley and adapted to effect a progressive variation in the drive ratio of said transmission as the speed of rotation of the driving pulley is altered, a torque sensing mechanism on the driven pulley being operative to effect a progressive variation in the drive ratio as a function of the torque transmitted through the said driven pulley, the latter being coupled to a transverse axle that is rotatably mounted in said snowmobile frame and carries drive means which forms a driving engagement with said track belt.

Preferably the speed reduction mechanism is a fixed ratio chain or gear drive in a housing that is directly coupled to the engine housing (or is an integral part of it) and has an output member that is coupled to the driving pulley (which also acts as a clutch mechanism, as is well understood in the art). The reduction ratio of this chain or gear drive is such that the speed of the driven pulley is low enough to allow its installation directly on the drive axle without the use of any additional reduction drive other than the variable ratio belt drive. The minimum reduction ratio necessary to accomplish this objective would be about 1.5:1. Preferably the reduction ratio would be somewhere in the range of about 1.5:1 to 2.3:1, depending on the power output characteristics of the engine as well as the specific vehicle application (utilitarian or performance oriented).

In this way, the driving pulley operates at a speed that is less than the crankshaft speed by the ratio of the reduction drive, and that is much lower than the speed of operation of the driving pulley in present day snowmobiles.

On the other hand, for a given power transmitted by a drive belt system, there is less energy dissipated or lost by the belt, since it is turning at a lower speed.

Consequently, the adoption of the new arrangement results in a significant increase of the mechanical efficiency of the belt drive system, which allows a higher vehicle top speed for a given engine output.

Furthermore, since the rotational speed of both pulleys is reduced, less energy is dissipated by aerodynamic drag created by the air flow generated by their rotation. Indeed, typical driven pulleys incorporate radial stiffening ribs in their construction to maintain their structural integrity under load. These ribs act just as the blades of a centrifugal fan, and pump a significant mass of air around under the cabin during operation, since these pulleys currently reach typical speeds in the neighbourhood of 8000 RPM. A current practice to overcome this problem is to bolt formed sheet metal covers over the sheaves of the driven pulley to shield the ribs and block the air flow. While this solution eliminates most of the aerodynamic losses, such covers are expensive and contribute to increase the weight and cost of the system.

Another major benefit resulting from the speed reduction of the belt drive system is the improvement in the dynamic response of the power train to throttle application. As a matter of fact, the energy required to accelerate a rotating mass being proportional to the second power of the angular speed, a significant reduction of kinetic energy is obtained by reducing the rotational speed of the system. This means that a power train incorporating a drive reduction mechanism interposed between the engine and the belt drive, will climb more quickly in RPM and require less energy to do so than a comparable engine rotating the driving pulley of the same belt drive system at crankshaft speed. Moreover, when the throttle is released, the RPM will also drop more quickly. In consequence, the reaction of the power train to throttle application is both more immediate and more precise.

As mentioned in the prior art discussion above, another benefit resulting from providing the reduction drive on the engine is the fact that the driving pulley, being no longer coupled directly on the end of the engine crankshaft, the bending vibrations to which the crankshaft is subjected during operation are no longer transmitted integrally into the driving pulley. This helps to reduce the stress imposed upon the driving pulley and the belt and also contributes to increasing the overall efficiency of the belt drive system.

Locating the reduction drive between the engine and the belt drive system also provides another important advantage: it opens the possibility of choosing the most adequate engine RPM for the vehicle application while operating within the optimal rotational speed range of the belt drive system. For instance, it becomes possible to increase the operational RPM of the engine to increase its specific power output without increasing the RPM of the pulleys (which would decrease the efficiency of the belt drive transmission system).

BRIEF DESCRIPTION OF THE DRAWINGS

The invention will further be described, by way of example only, with reference to the accompanying drawings wherein.

DESCRIPTION OF THE PREFERRED EMBODIMENT

Figure 2A:
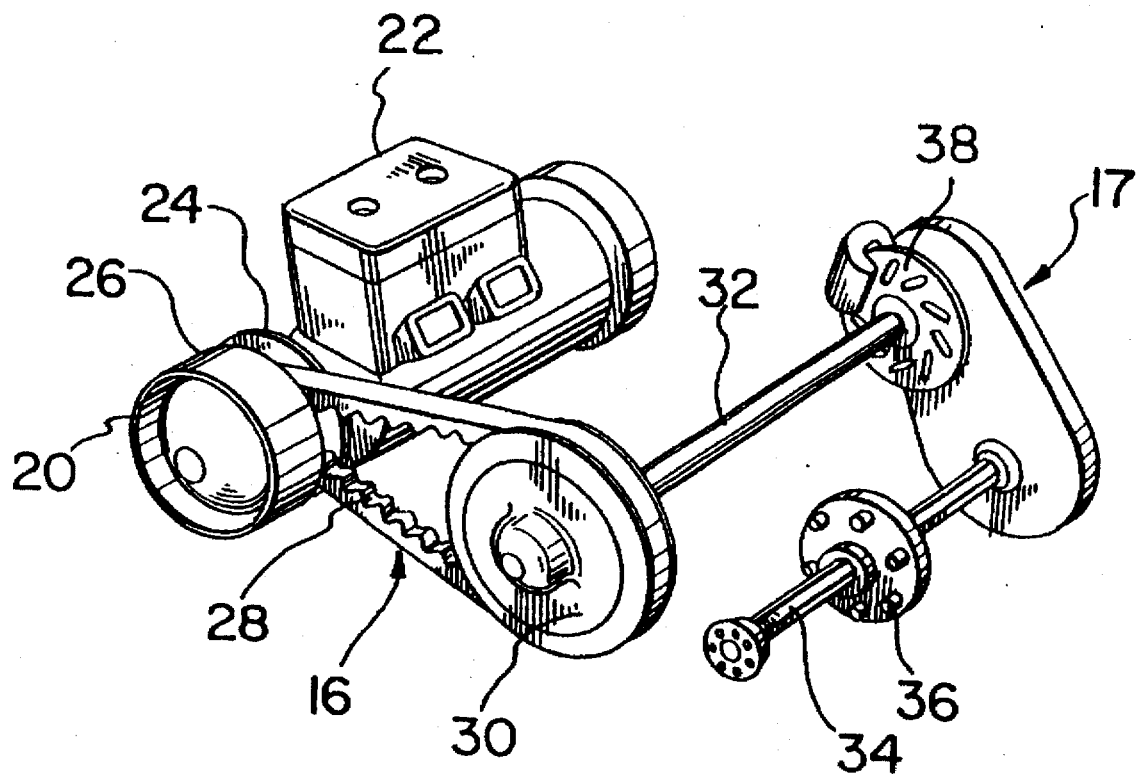
FIG. 2A is a schematic perspective view illustrating a drive train of the prior art.

A snowmobile 10 is supported at its forward end on a pair of steerable skis 12 and at its rearward end, on an endless drive track 14, which is passed in a loop over the drive and suspension elements. The snowmobile engine delivers power to the drive track through a drive train under the control of the driver or operator. FIG. 2A illustrates a typical prior art drive train incorporating a variable ratio belt drive system 16 and a fixed ratio reduction drive 17. The driving pulley 20 of the belt drive system 16 is coupled to rotate with the crankshaft of the engine 22 and incorporates a pair of opposed frustoconical belt drive flanges 24 and 26 between which the drive belt 28 is located. In known manner the flanges 24 and 26 are biassed apart, and the driving pulley 20 incorporates a centrifugally operated means that acts to urge the moving flange 26 towards the fixed flange 24 with a force that increases with increasing crankshaft speed so that as the engine speed increases the reduction ratio of the belt drive 16 decreases. The driven pulley 30 reacts to the output torque by varying its flange separation (not shown) which allows the belt to engage the driven pulley 30 at a diameter that reduces progressively as the engagement diameter between the belt 28 and the driving pulley 20 increases. The arrangement of such a variable ratio belt system drive need not be described in any detail, since it is well understood in the art.

The engine 22 is mounted transversely in the snowmobile, and parallel to its crankshaft there is a shaft 32 supported in bearings in the snowmobile frame (not shown) to rotate on an axis parallel to the engine crankshaft, the driven pulley being keyed to rotate with the shaft 32. The opposite end of the shaft 32 is coupled to the input of the reduction drive 17, the output of which is coupled to the drive axle 34 which is mounted to rotate in the snowmobile frame and carries sprocket wheels 36 that form a driving connection with the track 14. A braking system for the snowmobile incorporates a brake disc 38 fixed to rotate with the shaft 32.

From a consideration of the schematic layout shown in FIG. 2A it will be appreciated that the driving pulley 20 rotates at the same speed as the crankshaft of the engine whereas the drive axle 34 rotates at a lower speed than the shaft 32 because of the action of the reduction drive 17. Typically, the reduction drive 17 comprises a small sprocket on the jackshaft 32 coupled to drive a larger sprocket on the axle 34 through a driving chain, all enclosed within a housing 17A and are not shown since they are well known elements. In this arrangement the driving pulley 20 (being coupled directly to the crankshaft of the engine 22) is subjected to the same vibration pattern as the crankshaft and as a result may have a tendency to excessive wear and noise. Also, to maintain the efficiency of the drive belt 16, it is necessary to ensure that the center to center spacing between the driving pulley 20 and the driven pulley 30 remains constant, and that the alignment of these pulleys does not vary significantly. This in turn imposes restrictions on the amount of damping that can be incorporated in the vibration absorbing mountings (not shown) connecting the engine 22 to the snowmobile frame, and typically with this drive train there is a longitudinally extending tie rod (not shown) connecting the engine to the snowmobile frame, to prevent variations in the center-to-center distance between the pulleys 20 and 30. This however means that engine vibrations in this direction are not damped, but rather are transmitted through the tie rod to the snowmobile frame.

Figure 1:
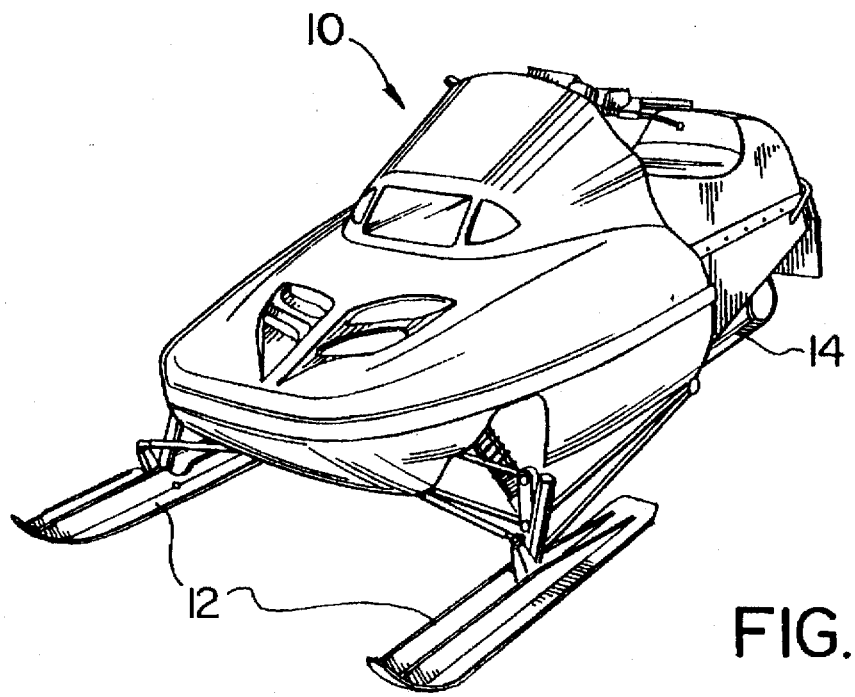
FIG. 1 is a perspective view of a snowmobile incorporating a drive train in accordance with the invention.
Figure 3:
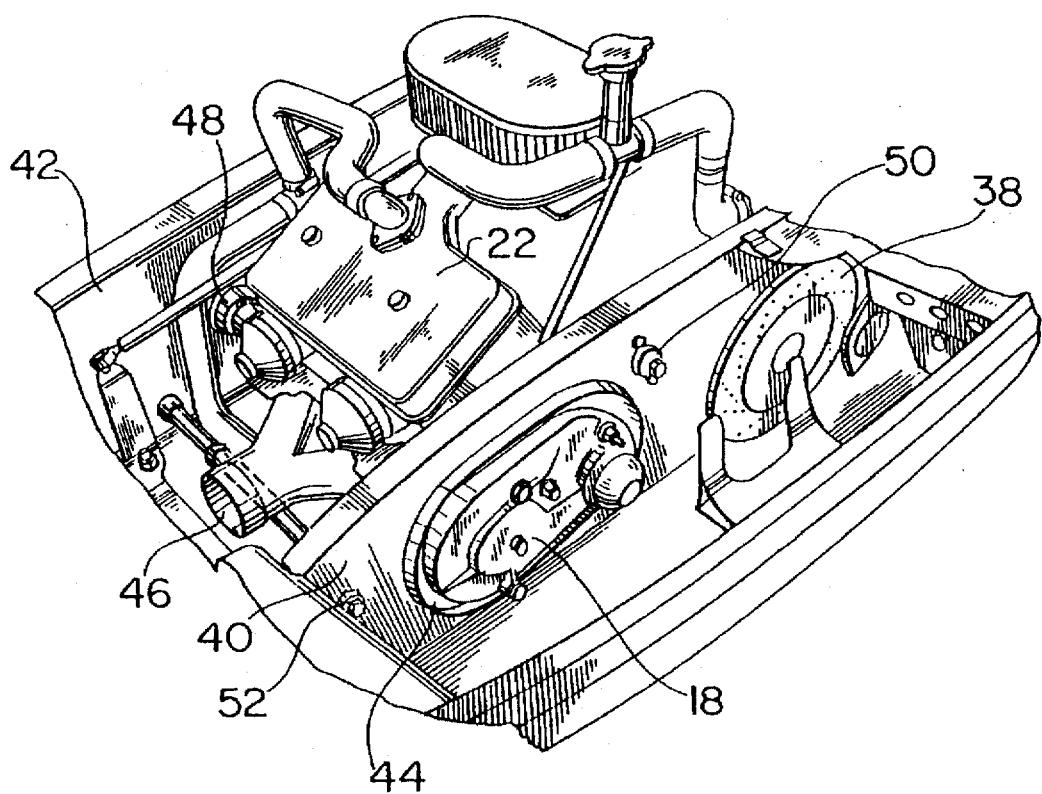
FIG. 3 is a partial view of the snowmobile engine and the drive train taken at a perspective corresponding to that of FIG. 1.
Figure 2B:
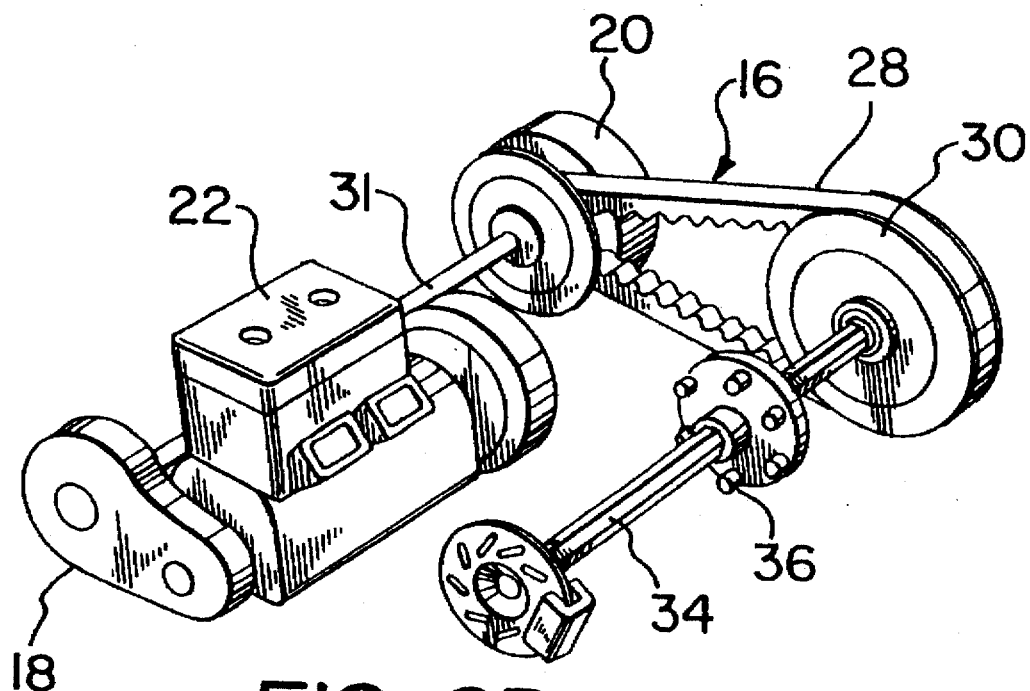
FIG. 2B is a view corresponding to FIG. 2A but showing the drive train in accordance with present invention.
Figure 4:
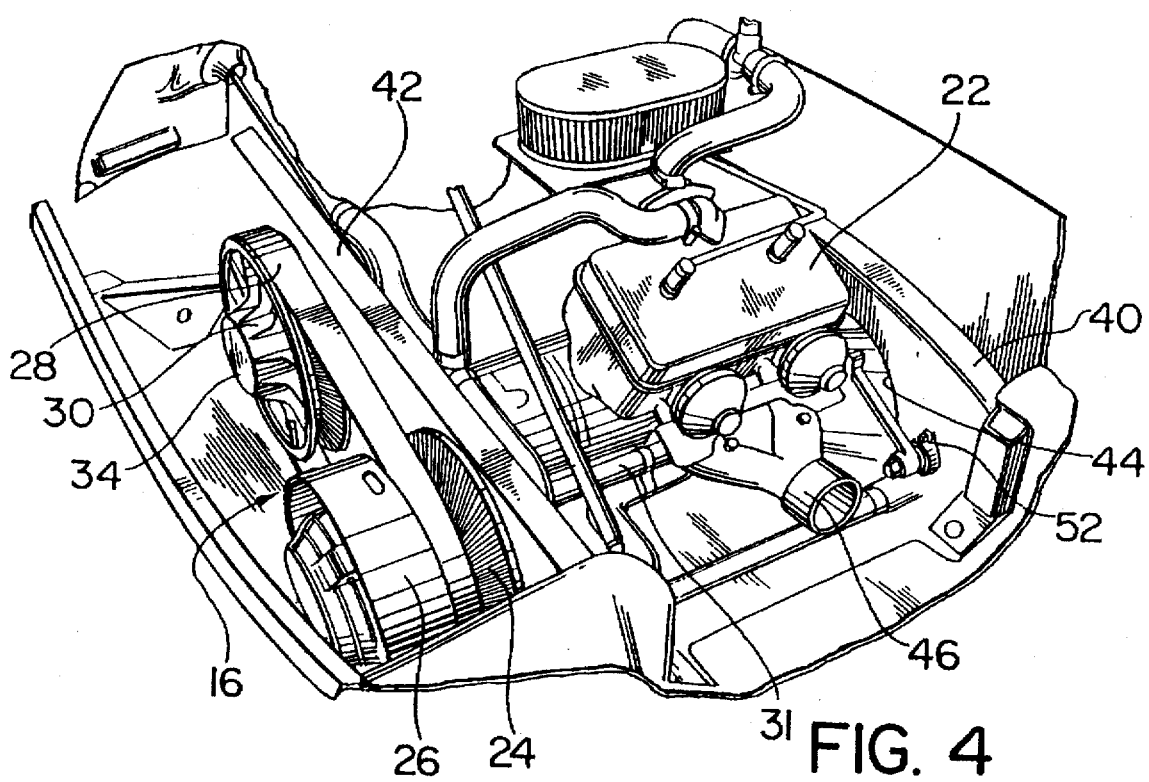
FIG. 4 is a front perspective view of the snowmobile engine and drive train taken from the opposite side to FIG. 1.

In the drive train according to the invention as shown in FIG. 2B, there is a fixed ratio reduction drive 18 connected directly to the engine 22 to be driven by the crankshaft of the engine, the output from this drive 18 being coupled to rotate a jackshaft 31 that extends transversely immediately to the front of the engine and is mounted to rotate in suitable bearings in the snowmobile frame. More specifically, as seen in FIGS. 3 and 4, the snowmobile frame incorporates a pair of laterally spaced vertically oriented structural walls 40 and 42 which extend in the fore-and-aft direction and which are spaced on opposite sides of the engine 22. As seen in FIG. 3, the fixed ratio reduction drive 18 has a housing that is accommodated in a large opening 44 in the left hand wall 40, the jack shaft 31 (not visible in this view) extending transversely on the front side of the engine beneath the exhaust manifold 46 and passing through a bearing 48 in the right side wall 42. On the outboard side of the frame wall 42 the jackshaft 31 supports the driven pulley 30.

The engine 22 is carried in vibration dampening mountings in the side walls 40 and 42 specifically a first such mounting 50 is mounted in the wall 40 forwardly of the opening 44 a second mounting 52 being located in the same wall but rearwardly of the opening. Similar vibration absorbing engine mountings (not shown) are provided as engine mountings in the wall 42.

With the arrangement as described above, it will be appreciated that the driving pulley 20 is positioned relatively close to the bearing 48 that supports the jackshaft 31 in the wall 42, and is thus effectively insolated from the effects of vibration induced engine motion. Specifically engine vibrations can reach the driving pulley 20 essentially only through the jackshaft 31, and therefor the amplitude of any such vibration would be diminished in proportion to the relative spacing from the bearing 48 to the driving pulley 20 on the one hand and to the end of the jackshaft that is coupled to the reduction drive housing 18 on the other hand. Typically this ratio is of the order of 1:7 to 1:3 so that the vibrations reaching the driving pulley 20 are very much diminished. In the same way and for the same reason, the force applied against the engine housing in reaction to the tensile forces generated in the belt under load is diminished in the same proportion. Thus, design of the vibration absorbing engine mounts 50, 52, etc. can be predicated solely on the desired objective of reducing vibrations applied to the snowmobile frame. It is no longer necessary to employ the prior art tie rod to limit displacement of the engine housing in the direction of the center-to-center spacing of the driving and driven pulleys of the belt drive, since the latter is now sufficiently displaced from the engine that this distance is not significantly changed by the engine housing displacement.

The driven pulley 30, is mounted directly on the axle 34 which drives the track 14 through the sprocket wheels 36.

From the comparison of the schematic layouts 2A and 2B, it can be appreciated that for a given reduction ratio of the belt drive system 16, the global reduction ratio between the crankshaft of the engine 22 and the track driving axle 34 will be similar if the ratio of the reduction drive 18 of FIG. 2B is the same as that of the reduction drive 17 of FIG. 2A. The most important consideration here is that the speed of rotation of the belt drive system 16 in the new configuration of FIG. 2B is much lower than that of the belt drive system 16 in the prior art configuration of FIG. 2A, i.e. is lower by the amount of the reduction ratio of the drive 18.

Furthermore, in the new arrangement, the driving pulley 20 being mounted on the output shaft of the reduction drive 18 instead of the crankshaft of the engine 22, it is no longer subjected to the bending vibrations which the crankshaft experiences during operation, which helps to reduce the stress imposed upon the driving pulley 20 and consequently reduce the noise and wear.

Figure 5:
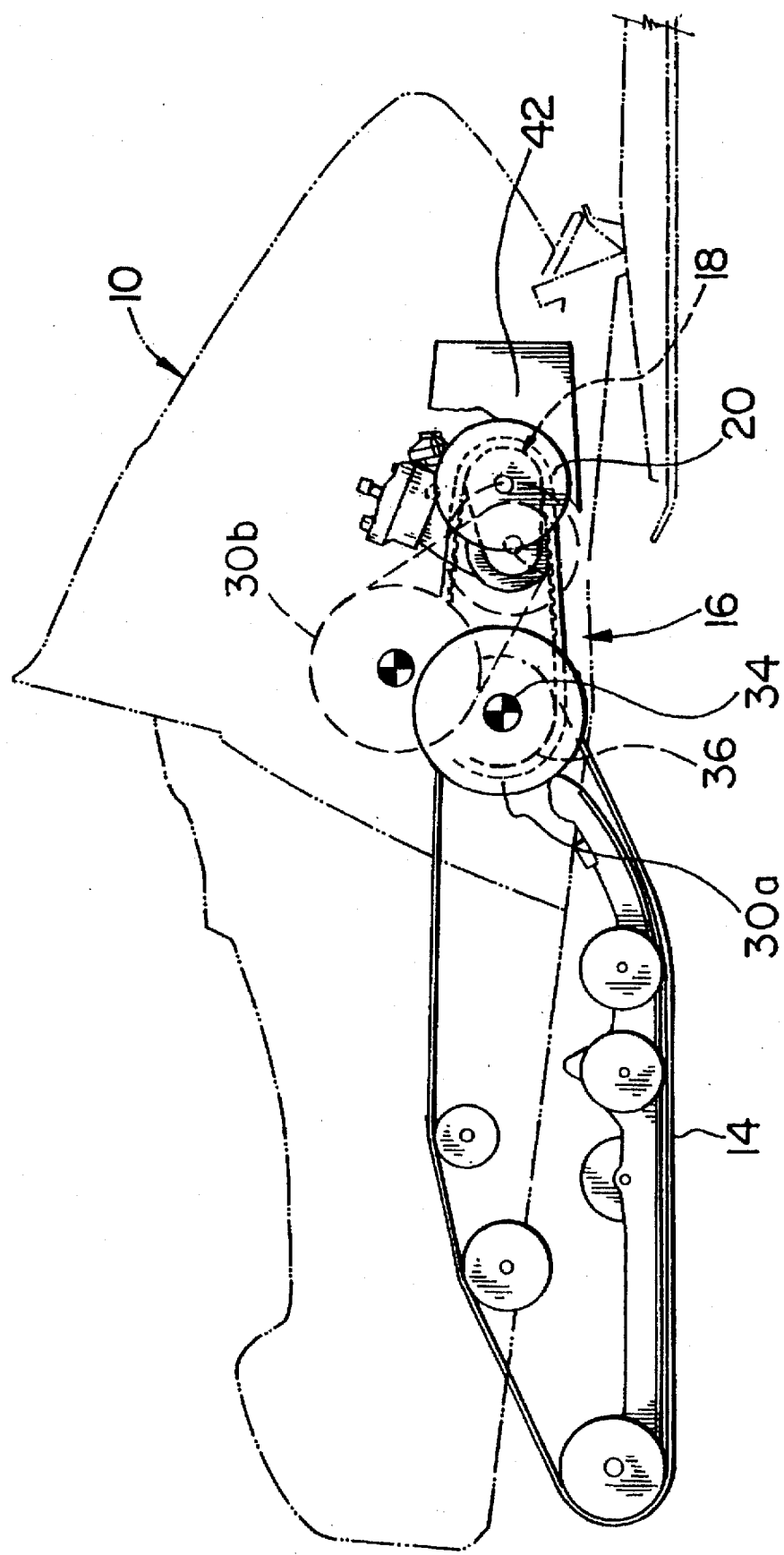
FIG. 5 is a somewhat schematic side view showing the power train layout of the snowmobile.

The net effect of the various modifications and novel arrangements discussed above is to provide a vehicle that has a more efficient more responsive drive train, as well as a lower center of gravity. This will be clear from a consideration of FIG. 5 wherein the arrangement of the present invention is shown in full lines, and the position of the drive train of the prior art arrangement are indicated by broken lines. It will be seen that in the new arrangement, the driven pulley 30a and its supporting shaft is located at a much lower position than was previously the case as can be seen by contemplating the prior location of the jackshaft 32 and driven pulley 30b, in FIG. 5.

Figure 6:
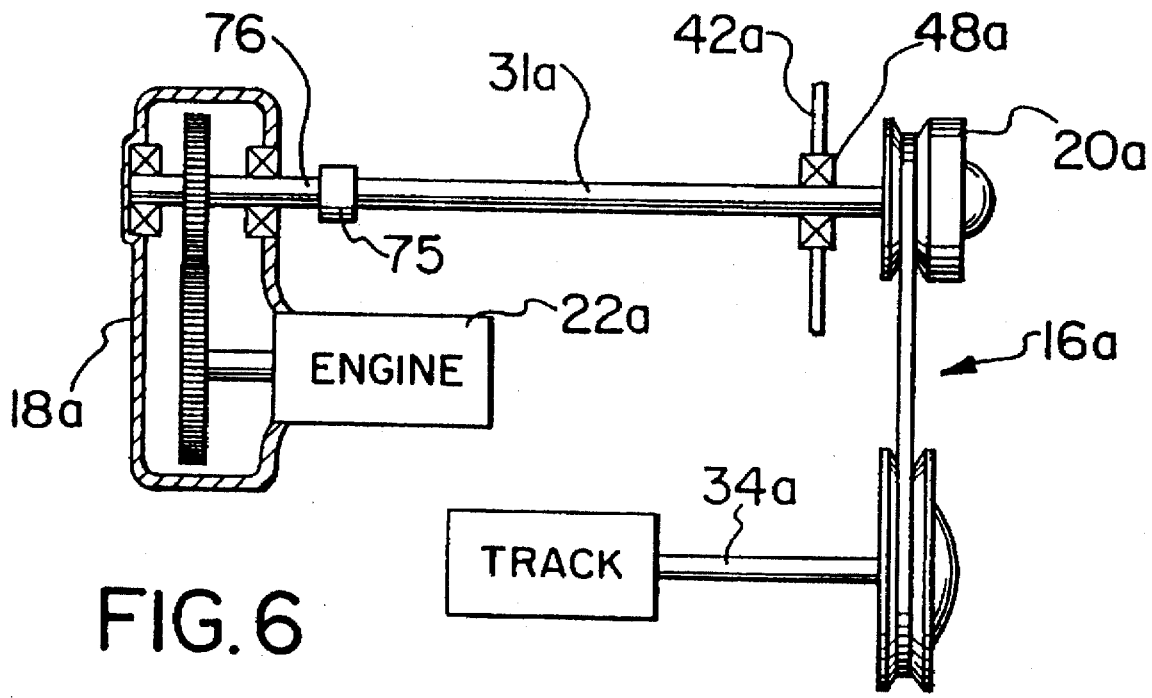
FIGS. 6 and 7 are somewhat schematic views showing alternate configurations of the drive train.
Figure 7:
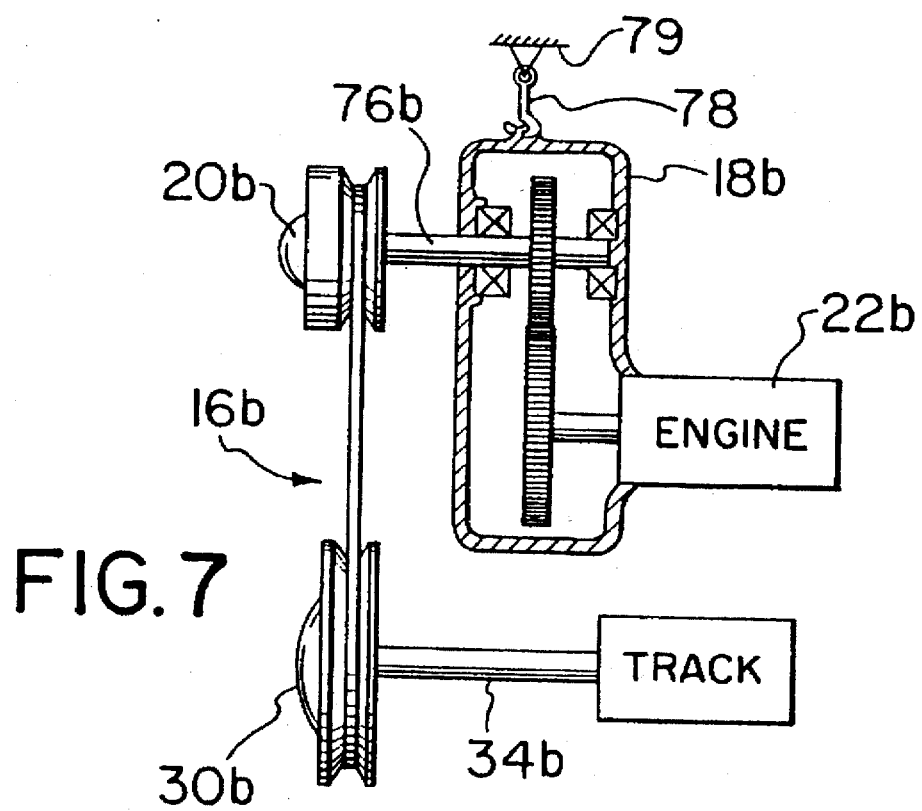

Other drive train configurations are possible within the ambit of the invention, as will now be described in relation to FIGS. 6 and 7. As seen in FIG. 6, the reduction drive 18a is of the geared variety and is connected directly to the engine 22a. As before, the drive is connected to the track drive axle 34a through a variable ratio belt drive system 16a, the driving pulley 20a of which is carried on a transverse jackshaft 31a supported in a bearing 48a in the frame wall 42a. However in this case there is a flexible coupling 75 interposed between the output shaft 76 of the reduction drive 18a and the jackshaft 31a. This coupling 75 further isolates the belt drive 16a from the effects of engine vibrations. In addition to damping the rotational vibrations transmitted through the reduction drive 18a from the engine crankshaft, the coupling 75 can compensate for minor misalignment between the jackshaft 31a and the output shaft 76, and also can compensate for lateral displacement of the engine 22a under load.

Even without utilizing the transverse jackshaft to isolate the belt drive system from the effects of engine vibrations and movements, there are still benefits to the use of a reduction drive attached directly to the engine and ahead of the belt drive. Such an arrangement is schematically shown in FIG. 7 wherein a geared reduction drive 18b is attached directly to the engine 22b, the output shaft 76b carrying the driving pulley 20b of the belt drive system 16b which delivers the engine power to the track drive axle 34b. This arrangement is more compact than the arrangements discussed above, but it must include the use of a tie bar 78 connected to the casing of the reduction drive 18b and attached to a fixed part 79 of the frame of the snowmobile to prevent excessive variation of the distance between the driving pulley 20b and the driven pulley 30b due to the tensile reaction forces in the belt under load. It will be appreciated that this arrangement incorporates many of the advantages of the layout shown in FIGS. 3 to 5, including the lower speed of operation of the belt drive.

What we claim is:

1. A snowmobile comprising:
   a frame having a forward end supported on steerable ski means and a rearward end supported on an endless drive track;
   an engine mounted in said frame, said engine having a output that is connected via a drive train to deliver propulsion power to said drive track;
   said drive train comprising a speed reduction mechanism that is carried on said engine and is drivingly connected to said engine output, said speed reduction mechanism having an output member that is drivingly connected to an input of a variable ratio belt drive transmission system, said variable ratio belt drive transmission system having a driving pulley that is journalled in said frame, and a driven pulley that is coupled to said drive track to deliver the propulsion power thereto.

2. A snowmobile as claimed in claim 1 wherein said variable ratio belt drive transmission system, includes a speed responsive mechanism operatively connected to said driving pulley and adapted to effect a progressive variation in the drive ratio of said transmission as the speed of rotation of the driving pulley is altered, a torque sensing mechanism on the driven pulley being operative to effect a progressive variation in the drive ratio as a function of the torque transmitted through the said driven pulley, the latter being coupled directly to a transverse axle that is rotatably mounted in said snowmobile frame and carries drive means which forms a driving engagement with said track belt.

3. A snowmobile as claimed in claim 1 wherein said speed reduction mechanism is a fixed ratio drive selected from a chain drive and a gear drive.

4. A snowmobile as claimed in claim 2 wherein said engine is mounted transversely so that said crankshaft extends generally parallel to said axle, said speed reducing mechanism being coupled to said output member and being of a kind selected from a chain drive and a gear drive.

5. A snowmobile as claimed in claim 4 wherein said fixed ratio drive is enclosed in a housing that is fixed with respect to said engine, said fixed ratio drive having an output member that is coupled to a transverse shaft that is rotatably mounted in the snowmobile frame, said driving pulley being coupled to rotate with said transverse shaft.

6. A snowmobile as claimed in claim 2 wherein said snowmobile engine is connected to said frame through vibration absorbing resilient mounting means adapted to substantially absorb vibration movements of the engine while reducing the transmission of engine vibration effects to said frame.

7. A snowmobile as claimed in claim 1 wherein said speed reduction mechanism has a ratio in the range of about 1.5 : to 2.3:1.

8. A snowmobile as claimed in claim 5 wherein said output member of said speed reduction mechanism is coaxial to said transverse shaft and is coupled thereto through a vibration absorbing coupling.

9. A snowmobile as claimed in claim 4 wherein the output member of said speed reduction mechanism extends to the outboard side of one of said side frame members where it is directly coupled to said driving pulley.

10. A snowmobile comprising:

a frame having a forward end supported on steerable ski means and a rearward end supported on an endless drive track;

an engine mounted in said frame, said engine having an output that is connected via a drive train to deliver propulsion power to said drive track; said drive train comprising
 a speed reduction mechanism that is carried on said engine and is drivingly connected to said engine output, said speed reduction mechanism having an output member that is drivingly connected to an input of a variable ratio belt drive transmission system;

said variable ratio belt drive transmission system comprising:
 a drive belt looped around a driving pulley and a driven pulley;
 a speed responsive mechanism operatively connected to said driving pulley and adapted to effect a progressive variation in the drive ratio of said transmission as the speed of rotation of the driving pulley is altered; and
 a torque sensing mechanism on the driven pulley being operative to effect a progressive variation in the drive ratio as a function of the torque transmitted through the said driven pulley, wherein said driven pulley is coupled, without interposition of any further speed change mechanism, to a transverse axle that is rotatably mounted in said snowmobile frame, said transverse axle carrying drive means which forms a driving engagement with said track belt.

11. A snowmobile as claimed in claim 10 wherein said speed reduction mechanism is a fixed ratio drive selected from a chain drive and a gear drive, and provides a speed reduction ratio between about 1.5:1 to 2.3:1.

12. A snowmobile as claimed in claim 11 wherein said engine is connected to said frame through a vibration-absorbing resilient mounting means which operates to absorb vibration movement of the engine thus reducing the transmission of engine vibration effects to said frame.

13. A snowmobile as claimed in claim 10 wherein said engine is mounted transversely of said snowmobile so that said crankshaft extends generally parallel to said axle, said speed reduction mechanism being enclosed within a housing that is fixed with respect to said engine and has an output member that is coupled through a vibration absorbing coupling to a transverse shaft, said transverse shaft being rotatably mounted in the snowmobile frame and carrying said driving pulley thereon.

* * * * *